US011104429B2

(12) United States Patent
Dunn

(10) Patent No.: US 11,104,429 B2
(45) Date of Patent: Aug. 31, 2021

(54) BLADE MOMENT ADJUSTMENT SYSTEM

(71) Applicant: Sikorsky Aircraft Corporation, Stratford, CT (US)

(72) Inventor: Eric Dunn, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 177 days.

(21) Appl. No.: 15/975,503

(22) Filed: May 9, 2018

(65) Prior Publication Data

US 2019/0344882 A1 Nov. 14, 2019

(51) Int. Cl.
*B64C 27/00* (2006.01)
*B64C 27/473* (2006.01)

(52) U.S. Cl.
CPC .......... *B64C 27/008* (2013.01); *B64C 27/473* (2013.01)

(58) Field of Classification Search
CPC ..... B64C 27/625; B64C 27/51; B64C 27/008; B64C 27/473; B64C 2027/7266; B64C 27/72; B64C 11/008; B64C 27/001; B64D 2045/0085; Y10T 29/49339; Y10T 464/50; Y10T 74/18576; F05D 2270/66
See application file for complete search history.

(56) References Cited

U.S. PATENT DOCUMENTS

| 2,576,105 A * | 11/1951 | Childs ................ F16F 15/18 |
| | | 416/31 |
| 8,075,249 B2 | 12/2011 | Metivier |
| 8,876,036 B2 | 11/2014 | McCollough et al. |
| 9,428,268 B2 | 8/2016 | Kopanski et al. |
| 2015/0132132 A1 | 5/2015 | Welsh |
| 2019/0047682 A1 | 2/2019 | Haldeman |

FOREIGN PATENT DOCUMENTS

EP 1580543 A2 9/2005

* cited by examiner

*Primary Examiner* — J. Todd Newton, Esq.
*Assistant Examiner* — Eric J Zamora Alvarez
(74) *Attorney, Agent, or Firm* — Foley & Lardner LLP

(57) ABSTRACT

An aircraft rotor blade assembly includes a rotor blade rotatable about an axis of rotation and a weighted assembly mounted to the aircraft rotor blade. The weighted assembly includes an actuator which moves a mass to adjust a moment of the rotor blade assembly when the rotor blade is rotated about the axis of rotation.

20 Claims, 4 Drawing Sheets

BLADE MOMENT ADJUSTMENT SYSTEM

BACKGROUND

The subject matter disclosed herein generally relates to rotors for aircraft use. More specifically, the subject disclosure relates to balancing of main rotor blades of rotor craft.

For the rotor blade to operate properly in the dynamic environment in which it is used, the blade must meet requirements for balance so as to not result in excessive vibration levels when used in the rotorcraft. A typical rotor blade for a rotor craft, such as a helicopter or dual coaxial rotor rotorcraft is formed from several components including a spar with counterweights, a trailing edge pocket assembly including one or more skins, such as upper and lower skins, with a core there between, and a leading edge assembly including a leading edge sheath and other components. These components are typically secured to each other by a structural film adhesive bond and/or other fastener resulting in a blade assembly.

Manufacture of the various components and their assembly introduces some variation in weight and weight distribution into the blade assembly. This variation may be observed by measuring the weight and moments of the completed blade assembly via a balance procedure, often including a whirl fixture, in which the blade assembly is spun with a master rotor blade having a selected weight and weight distribution. The rotation of the blade assembly is observed and compared to the master rotor blade, and any variation between the two is indicative of variation in weight or weight distribution of the blade assembly compared to the master rotor blade. Such variation is corrected in the blade assembly by removing material or counterweights up to certain acceptable or feasible limits. The limits constrain how severe of an out of balance condition of the blade assembly can be corrected, resulting in potential of scrapping costly rotor blade assemblies.

BRIEF DESCRIPTION

According to an embodiment, an aircraft rotor blade assembly includes a rotor blade rotatable about an axis of rotation and a weighted assembly mounted to the aircraft rotor blade. The weighted assembly includes an actuator which moves a mass to adjust a moment of the rotor blade assembly when the rotor blade is rotated about the axis of rotation.

In addition to one or more of the features described above, or as an alternative, in further embodiments the rotor blade comprises a skin defining an outer mold line and an interior portion, and the weighted assembly is arranged within the interior portion of the rotor blade.

In addition to one or more of the features described above, or as an alternative, in further embodiments the rotor blade further comprises a spar assembly disposed within the interior portion, the weighted assembly being affixed to the spar assembly.

In addition to one or more of the features described above, or as an alternative, in further embodiments the weighted assembly is aligned with and disposed at a feathering axis of the aircraft rotor blade assembly.

In addition to one or more of the features described above, or as an alternative, in further embodiments the rotor blade has a spanwise direction and a chordwise direction perpendicular to the spanwise direction, and the mass is movable in the chordwise direction.

In addition to one or more of the features described above, or as an alternative, in further embodiments the rotor blade has a spanwise direction and a chordwise direction perpendicular to the spanwise direction, and the mass is movable in the spanwise direction.

In addition to one or more of the features described above, or as an alternative, in further embodiments the rotor blade has a spanwise direction and a chordwise direction perpendicular to the spanwise direction, and the mass is independently movable in the spanwise direction and the chordwise direction.

In addition to one or more of the features described above, or as an alternative, in further embodiments the actuator comprises a linear actuator operably coupled to mass to move the mass relative to the aircraft rotor blade.

In addition to one or more of the features described above, or as an alternative, in further embodiments the actuator is operable to move the mass when the aircraft rotor blade assembly is in a static condition when the rotor blade is not being rotated about the axis of rotation.

In addition to one or more of the features described above, or as an alternative, in further embodiments the actuator is operable to move the mass when the aircraft rotor blade assembly is in a dynamic condition when the rotor blade is rotated about the axis of rotation.

In addition to one or more of the features described above, or as an alternative, in further embodiments the mass is indirectly coupled to the actuation mechanism.

In addition to one or more of the features described above, or as an alternative, in further embodiments the weighted assembly further comprises a biasing mechanism coupled to the mass.

In addition to one or more of the features described above, or as an alternative, in further embodiments the biasing mechanism is positioned to counteract a centrifugal force acting on the mass when the rotor blade is rotated about the axis of rotation.

In addition to one or more of the features described above, or as an alternative, in further embodiments the mass is automatically movable to adjust the moment of the rotor blade assembly in response to a command from an input received from a flight control computer.

In addition to one or more of the features described above, or as an alternative, in further embodiments the aircraft rotor blade assembly further comprises a rotor hub rotatable about the axis of rotation, the rotor blade being mounted to the rotor hub.

In addition to one or more of the features described above, or as an alternative, in further embodiments the rotor blade includes a first weighted assembly and a second weighted assembly.

In addition to one or more of the features described above, or as an alternative, in further embodiments the rotor blade has a spanwise direction and a chordwise direction oriented perpendicular to the spanwise direction, the first weighted assembly being operable in the spanwise direction.

In addition to one or more of the features described above, or as an alternative, in further embodiments the second weighted assembly is operable to in the chordwise direction of the aircraft rotor blade.

In addition to one or more of the features described above, or as an alternative, in further embodiments the rotor blade has a spanwise direction and a chordwise direction perpendicular to the spanwise direction, and the mass of the weighted assembly includes a first mass and a second mass, the first mass being movable in the spanwise direction and the second mass being movable in the chordwise direction to adjust the moment of the aircraft rotor blade.

In addition to one or more of the features described above, or as an alternative, in further embodiments the first mass is movable independently from the second mass.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
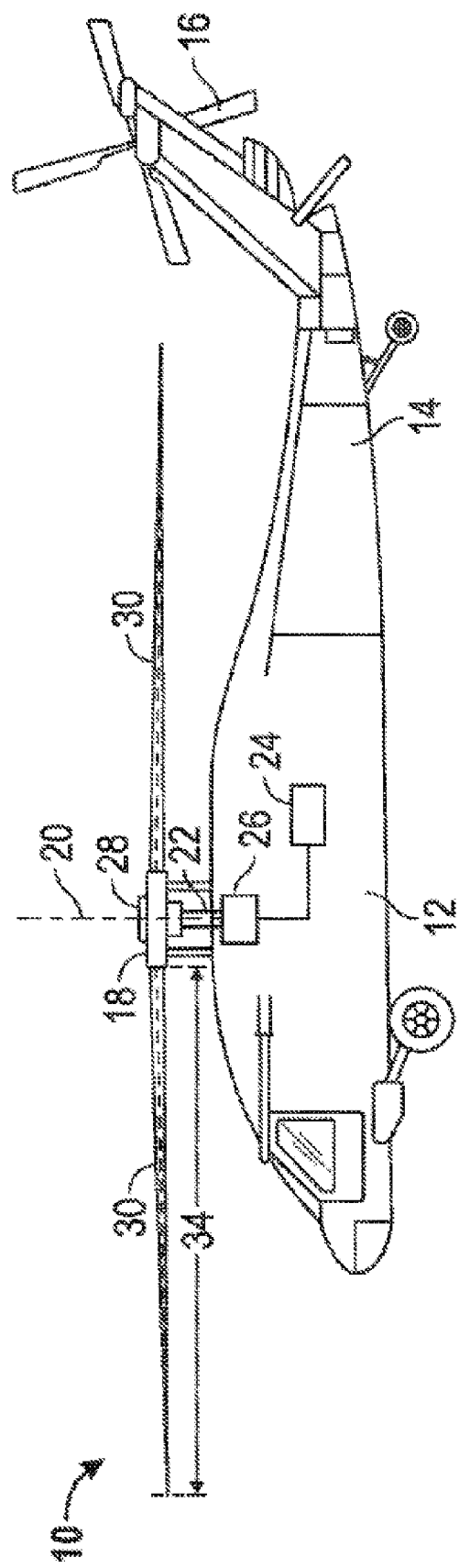
FIG. 1 is a side view of a rotary wing aircraft.

FIG. 1 schematically illustrates a rotary-wing aircraft 10, such as a helicopter for example. The aircraft 10 includes an airframe 12 having an extending tail 14 which mounts a tail rotor system 16, such as an anti-torque system for example. A main rotor assembly 18 is driven about an axis of rotation 20. In an embodiment, a drive shaft 22 operably couples the main rotor assembly to a power source, such as an engine (illustrated schematically at 24) for example, through a main gearbox (illustrated schematically at 26). The main rotor system 18 includes a plurality of rotor blades 30 mounted to a rotor hub 28. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, multirotor, turboprops, tilt-rotors, and tilt-wing aircraft, will also benefit from the present invention.

Figure 2:
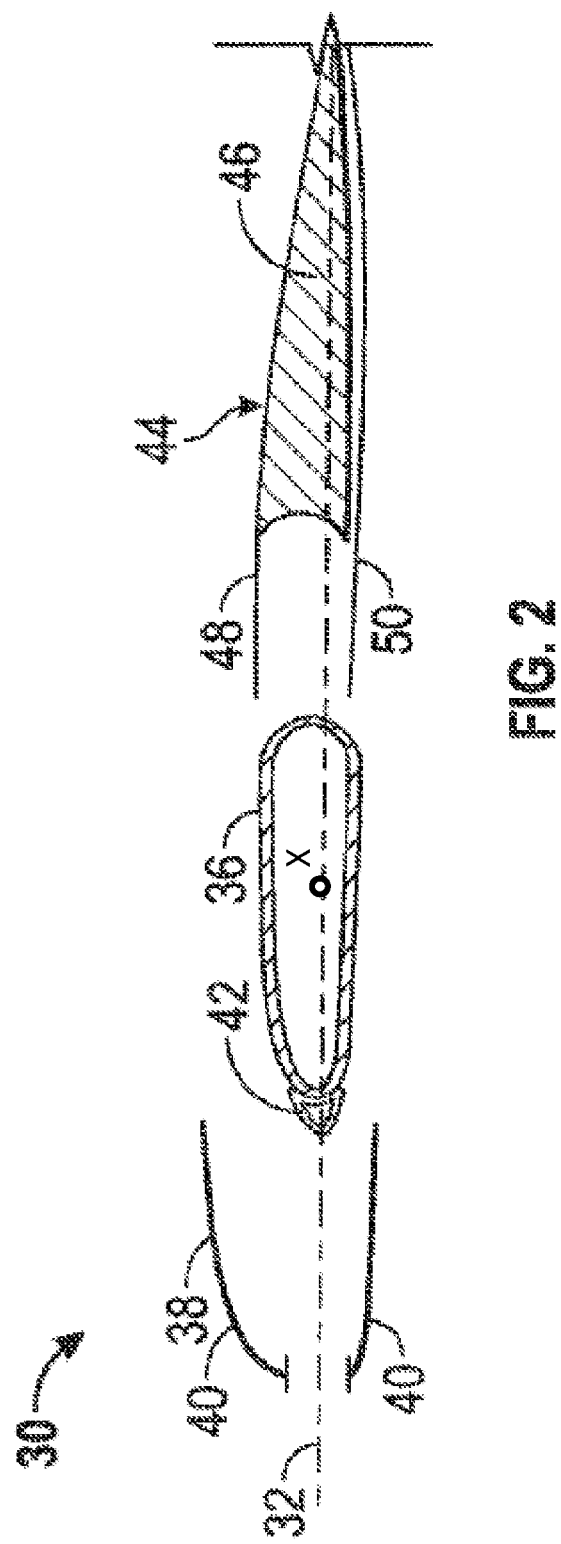
FIG. 2 is an exploded cross-sectional view of a rotor blade assembly of a rotary wing aircraft.

Referring now to FIG. 2, an embodiment of a rotor blade assembly, such as a rotor blade assembly 30 of the main rotor assembly 18 for example, is illustrated in more detail. However, it should be understood that as used herein, the term "rotor blade" or "rotor blade assembly" is intended to refer to any blade mounted to a portion of an aircraft for rotation about an axis to generate an aerodynamic force, such as lift or thrust for example, acting on the aircraft. Accordingly, rotor blades of a main rotor assembly, a tail rotor system, a translational thrust system, an engine, a generator, or another aircraft component are all considered within the scope of the disclosure.

As shown, the rotor blade assembly 30 includes numerous subassemblies arranged along a blade chord 32 extending along a blade assembly length or span (FIG. 2). The subassemblies include a center subassembly (i.e., a spar assembly 36), a leading edge subassembly 38, and a pocket subassembly 44. The spar assembly 36 includes a plurality of counterweights 42 and the leading edge subassembly 38 includes a leading edge sheath 40. In an embodiment, the pocket subassembly 44 includes a core 46, an upper skin 48, and a lower skin 50. Although three distinct subassemblies 36, 38, 44 are shown, it should be understood that the construction of the blade assembly 30 illustrated and described herein is intended as an example only and that any type of blade assembly having any number of subassemblies is within the scope of the disclosure.

Figure 3:
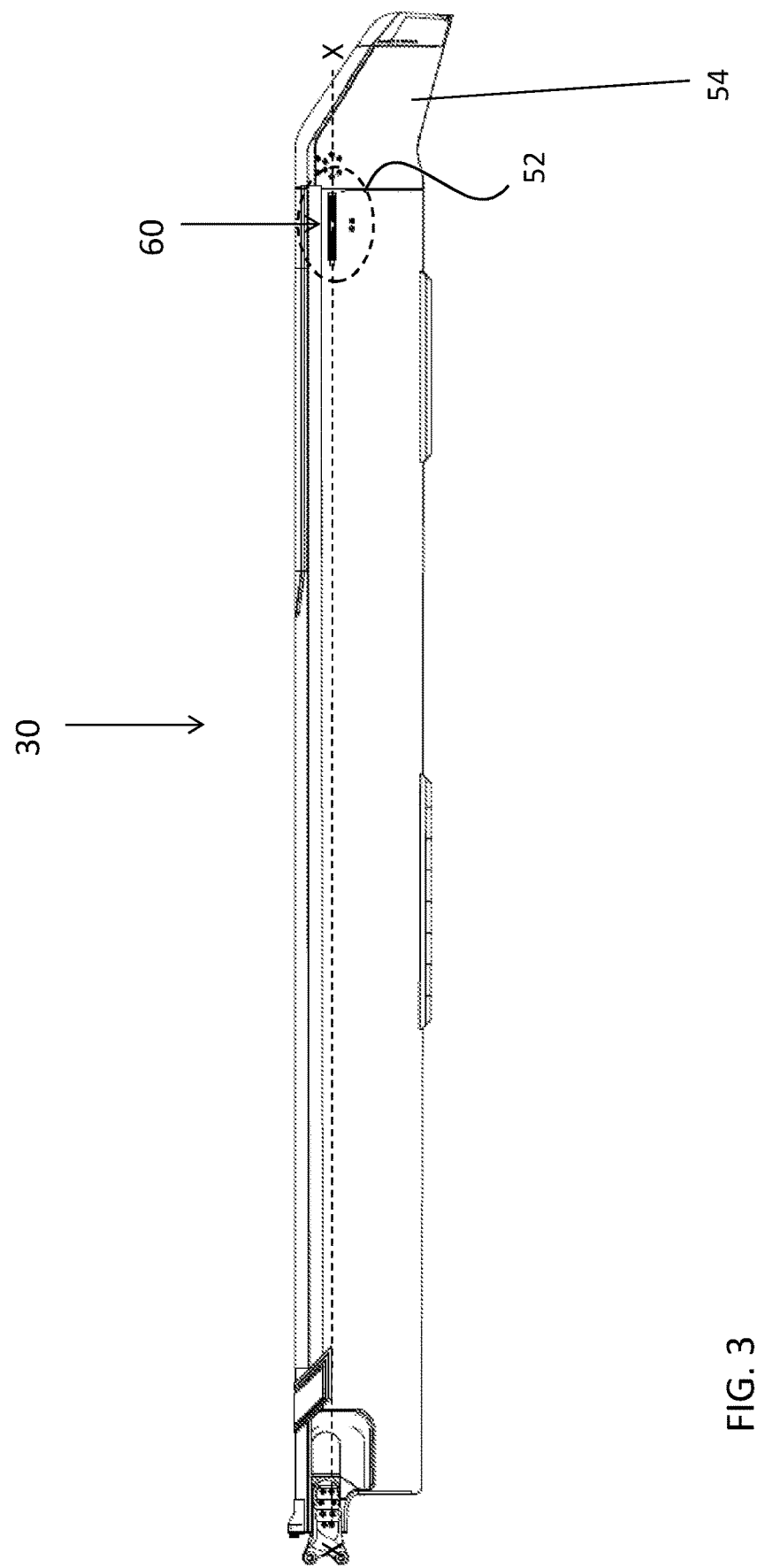
FIG. 3 is a plan view of a rotor blade assembly of a rotary wing aircraft including a weighted assembly according to an embodiment.
Figure 4:
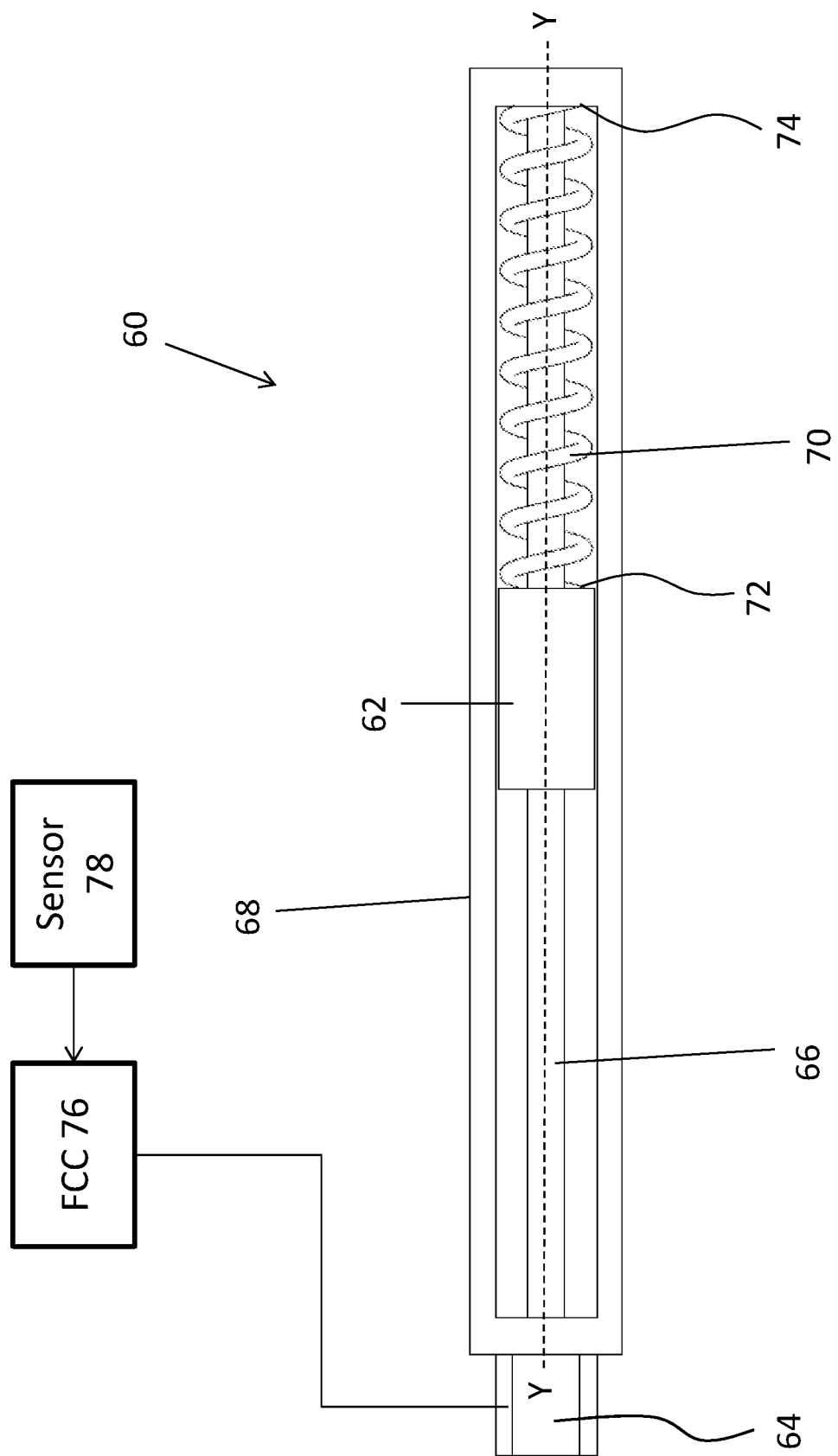
FIG. 4 is a cross-sectional view of a weighted assembly according to an embodiment.

With reference now to FIGS. 3 and 4, to ensure that the rotor blade assembly 30 is balanced within selected mass and moment requirements, the rotor blade assembly 30 includes at least one weighted assembly 60. In embodiments where the rotor blade assembly 30 includes multiple weighted assemblies, the plurality of weighted assemblies 60 may have substantially identical, or alternatively, different configurations. Further, the weighted assemblies 60 may be located at generally the same location or different locations about the rotor blade assembly 30 and may be configured to provide adjustment in either the same direction or different directions relative to the rotor blade assembly 30. In an embodiment, the at least one weighted assembly 60 is installed within an interior portion of the rotor blade assembly 30. For example, the weighted assembly 60 may be bonded or affixed in some way to a portion of the spar assembly 36. In some embodiments, a portion of the core 46 arranged adjacent the spar assembly 36 may be removed to form an opening within which the weighted assembly 60 may be positioned.

In the illustrated, non-limiting embodiment of FIG. 3, a weighted assembly 60 is located near a tip end 52 of the rotor blade assembly 30. By positioning the weighted assembly 60 at this location, the weighted assembly 60 may be accessible after the tip cap 54 of the rotor blade assembly 30 is removed. However, it should be understood that in other embodiments, the rotor blade assembly 30 may include a weighted assembly 60 arranged at another location. Further, the weighted assembly 60 may be aligned within the feathering or pitch axis X of the rotor blade assembly 30, which extends in a spanwise direction near the spar assembly 36 relative to the chord 32. The spanwise direction is generally perpendicular with the chord 32. By aligning the weight assembly 60 along the feathering axis X along the span, the balance of the rotor blade assembly 30 remains generally constant as the rotor blade assembly 30 is rotated about the feathering axis X. However, in other embodiments, the weighted assembly 60 need not be aligned with the feathering axis X.

An example of a weighted assembly 60 is shown in more detail in FIG. 4. The weighted assembly 60 is typically an electromechanical system including one or more weights or masses 62 that are movable relative to the rotor blade assembly 30, such as via an actuation system 64, to adjust a moment or balance of the rotor blade assembly 30. The one or more masses 62 may be sized based on the initial static balance of the rotor blade. As shown, the mass 62 is typically movable linearly along at least one axis. In the embodiment shown in FIG. 3, the mass 62 is movable linearly along an axis Y which is oriented substantially parallel with the feathering axis. However, embodiments where the mass 62 is movable in a different manner are also within the scope of the disclosure. By way of example, the mass 62 of the weighted assembly 60 could be movable along an axis Y which extends in at least one of a spanwise and a chordwise direction relative to the rotor blade assembly 30. In embodiments where the weighted assembly 60 includes a plurality of masses 62, there could be multiple axis Y with one of the masses 62 having an axis Y to be movable in the spanwise direction and another of the masses 62 having an axis Y to be movable in the chordwise direction. Alternatively, or in addition, in some embodiments, a single mass 62 of the assembly 60 may be movable in both a spanwise and chordwise direction. In such embodiments, the mass 62 may be movable in the spanwise direction and the chordwise direction independently using multiple axes Y via a single actuation mechanism 64 or multiple actuation mechanisms 64.

In the example of the actuation mechanism 64 shown in FIG. 4, the actuation mechanism 64 is an actuator, servo or motor for example, associated with the mass 62 and is operable to move the mass 62 relative to the rotor blade assembly 30. In the illustrated, non-limiting embodiment, the actuation mechanism 64 is indirectly coupled to the mass 62 via a threaded rod 66. The actuation mechanism 64 is configured to rotate the threaded rod 66 in either a first direction or a second, opposite direction. The mass 62 is arranged in threaded engagement with the rod 66, such that as the rod 66 is rotated in a first direction, the mass translates along the axis Y defined by the rod 66 in a first direction, such as toward the actuation mechanism 64 for example. Similarly, as the rod 66 is rotated in a second, opposite direction, the mass 62 moves along the axis Y defined by the rod 66 in a second direction, such as away from the actuation mechanism 64 for example. While shown in the context of a mechanical linear servo or actuator, the actuation mechanism 64 can be pneumatic or fluidically driven in other aspects.

In an embodiment, the weighted assembly 60 includes a housing 68 within which the mass 62 and the one or more components connecting the mass 62 to the actuation mechanism 64 are located. The housing 68 not only supports the one or more components connecting the mass 62 to the actuation mechanism 64, i.e. the threaded rod 66 for example, but also defines a limit for the movement of the mass 62 in one or more directions. However, embodiments where the mass 62 is directly connected to the actuation mechanism 64 are also contemplated herein. In an embodiment, the mass 62 is arranged in low friction contact with the housing 68. Accordingly, as the rod 66 is rotated in a first direction, the mass 62 is unable to rotate about the Y axis due to the constraint of the housing 68.

In an embodiment, the housing 68 may also house an encoder, such as a linear encoder for example, operable to sense and report the position of the mass 62. Alternatively, or in addition, the position of the mass 62 may be determined through one or more angular encoders associated with the actuation mechanism 64.

In an embodiment, a biasing mechanism 70 such as an axial coil spring for example, is mounted to an end 72 of the mass 62 and an adjacent end 74 of the housing 68. Inclusion of the biasing mechanism 70 is intended to alleviate or neutralize the centrifugal force acting on the mass 62 during rotation of the rotor blade assembly 30 about an axis, such as axis 20 for example. Accordingly, inclusion of the biasing mechanism 70 reduces the size of the actuation mechanism 64 required to counteract the centrifugal force to move the mass 62. It should be understood that the biasing mechanism 70 need not be used in all aspects, such as when the axis Y is perpendicular to the centrifugal force, when the actuation mechanism 64 is not operated while the rotor blade assembly 30 is experiencing the centrifugal force, or where the actuation mechanism 64 is sized such that the biasing mechanism 70 is not needed.

The actuation mechanism 64 may include a self-contained power source, such as a battery for example, or alternatively, may be connected to another system within the rotor blade assembly 30 to receive power, such as a de-icing system for example. A command received by the actuation mechanism 64 may be transmitted wirelessly, through physical power conductors in a signal over power configuration, or on dedicated signal conductors for example. A command received by the actuation mechanism 64 may indicate how far to move the mass 62 and in what direction relative to the rotor blade assembly 30. In an embodiment, the actuation mechanism 64 may include a processor configured to identify the specific operation of the actuation mechanism necessary to achieve the commanded movement of the mass 62. Alternatively, the commands provided to the actuation mechanism 64 may have already converted the desired movement of the mass 62 into specific commands for operation of the actuation mechanism 64 to achieve the desired movement. The actuation mechanism 64 may be operable to adjust the position of the mass 62 relative to the rotor blade assembly 30 during both static and dynamic conditions of the rotor blade assembly 30.

According to the embodiment shown in FIG. 4, the actuation mechanism 64 may be arranged in communication with and receives one or more commands from a flight control computer 76 of the aircraft so as to be controlled while in flight. A plurality of sensors 78, mounted to at least one of the airframe 12 and rotor hub 28 and the rotor blade assembly 30, communicate a measured vibratory acceleration and or centrifugal force exerted by and individual blade to the flight control computer 76. The flight control computer 76 may utilize one or more algorithms to determine what adjustment of the one or more weight assemblies 60 spanwise or chordwise is necessary to reduced vibration or otherwise improve flight characteristics of the rotor blade assembly 30. However, in other embodiments, the actuation mechanism 64 may receive inputs directly from an operator of the aircraft or from another system of the aircraft, such as through an external computer or remote control.

Integration of one or more weighted assemblies into the rotor blade assembly 30 may eliminate the need for costly and time consuming dynamic balancing. The weighted assembly may additionally eliminate the weight cups that are currently located within and distribute weight across a portion of the rotor blade. In addition, the weighted assembly may be operable to address dynamic instabilities that occur during flight or over the lifetime of the rotor blade assembly.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft rotor blade assembly comprising:
a rotor blade rotatable about an axis of rotation, the rotor blade including a tip cap; and
a weighted assembly mounted within an interior of the rotor blade such that the weighted assembly is accessible upon removal of the tip cap, the weighted assembly including an actuator which moves a mass to adjust a moment of the aircraft rotor blade assembly when the rotor blade is rotated about the axis of rotation and a biasing mechanism comprising an axial spring and a housing, the axial spring being coupled to the housing, wherein the actuator (i) receives a command from a flight control computer based on a measured vibratory acceleration and a centrifugal force exerted by the rotor blade, and (ii) adjusts the moment of the aircraft rotor blade assembly in response to the command.

2. The aircraft rotor blade assembly of claim 1, wherein the rotor blade comprises a skin defining an outer mold line and an interior portion, and the weighted assembly is arranged within the interior portion of the rotor blade.

3. The aircraft rotor blade assembly of claim 2, wherein the rotor blade further comprises a spar assembly disposed within the interior portion, the weighted assembly being affixed to the spar assembly.

4. The aircraft rotor blade assembly of claim 1, wherein the weighted assembly is aligned with and disposed at a feathering axis of the aircraft rotor blade assembly.

5. The aircraft rotor blade assembly of claim 1, wherein the rotor blade has a spanwise direction and a chordwise direction perpendicular to the spanwise direction, and the mass is movable in the chordwise direction.

6. The aircraft rotor blade assembly of claim 1, wherein the rotor blade has a spanwise direction and a chordwise direction perpendicular to the spanwise direction, and the mass is movable in the spanwise direction.

7. The aircraft rotor blade assembly of claim 1, wherein the rotor blade has a spanwise direction and a chordwise direction perpendicular to the spanwise direction, and the mass is independently movable in the spanwise direction and the chordwise direction.

8. The aircraft rotor blade assembly of claim 1, wherein the actuator comprises a linear actuator operably coupled to the mass to move the mass relative to the rotor blade.

9. The aircraft rotor blade assembly of claim 8, wherein the actuator is operable to move the mass when the aircraft rotor blade assembly is in a static condition in which the rotor blade is not being rotated about the axis of rotation.

10. The aircraft rotor blade assembly of claim 8, wherein the actuator is operable to move the mass when the aircraft rotor blade assembly is in a dynamic condition in which the rotor blade is rotated about the axis of rotation.

11. The aircraft rotor blade assembly of claim 8, wherein the mass is indirectly coupled to the linear actuator.

12. The aircraft rotor blade assembly of claim 1, wherein the mass is automatically movable to adjust the moment of the aircraft rotor blade assembly in response to the command from an input received from the flight control computer.

13. The aircraft rotor blade assembly of claim 1, wherein the aircraft rotor blade assembly further comprises a rotor hub rotatable about the axis of rotation, the rotor blade being mounted to the rotor hub.

14. The aircraft rotor blade assembly of claim 1, wherein the rotor blade includes a first weighted assembly and a second weighted assembly.

15. The aircraft rotor blade assembly of claim 14, wherein the rotor blade has a spanwise direction and a chordwise direction oriented perpendicular to the spanwise direction, the first weighted assembly being operable in the spanwise direction.

16. The aircraft rotor blade assembly of claim 15, wherein the second weighted assembly is operable to in the chordwise direction of the rotor blade.

17. The aircraft rotor blade assembly of claim 1, wherein the rotor blade has a spanwise direction and a chordwise direction perpendicular to the spanwise direction, and the mass of the weighted assembly includes a first mass and a second mass, the first mass being movable in the spanwise direction and the second mass being movable in the chordwise direction to adjust the moment of the rotor blade.

18. The aircraft rotor blade assembly of claim 17, wherein the first mass is movable independently from the second mass.

19. An aircraft rotor blade assembly comprising:
a rotor blade rotatable about an axis of rotation, the rotor blade including a tip cap; and
a weighted assembly mounted within an interior of the rotor blade such that the weighted assembly is accessible upon removal of the tip cap, wherein the weighted assembly comprises:
a linear actuator comprising a threaded rod, which moves a mass to adjust a moment of the aircraft rotor blade assembly when the rotor blade is rotated about the axis of rotation, wherein the mass is disposed within a housing and coupled to the actuator; and
a biasing mechanism coupled to the mass, the biasing mechanism comprising an axial coil spring mounted to an end of the mass and an adjacent end of the housing,
wherein the moment of the rotor blade is adjusted based on the threaded rod moving the mass and on the axial coil spring offsetting a centrifugal force acting on the mass.

20. The aircraft rotor blade assembly of claim 19, wherein the axial coil spring is positioned to counteract the centrifugal force acting on the mass when the rotor blade is rotated about the axis of rotation.

* * * * *